Figure 1:
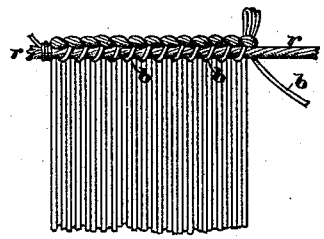

(No Model.) 2 Sheets—Sheet 1.

J. SLADDIN.
HARNESS FOR LOOMS.

No. 306,115. Patented Oct. 7, 1884.

Witnesses:
W. W. Swan
Wm. S. Rogers

Inventor:
Joseph Sladdin (No Model.)  2 Sheets—Sheet 2.

J. SLADDIN.
HARNESS FOR LOOMS.

No. 306,115.  Patented Oct. 7, 1884.

Witnesses:

Inventor:

UNITED STATES PATENT OFFICE.

JOSEPH SLADDIN, OF LAWRENCE, MASSACHUSETTS.

HARNESS FOR LOOMS.

SPECIFICATION forming part of Letters Patent No. 306,115, dated October 7, 1884.

Application filed February 23, 1883. (No model.)

*To all whom it may concern:*

Be it known that I, JOSEPH SLADDIN, of Lawrence, in the State of Massachusetts, have invented a new and useful Improvement in Harness for Looms, of which the following is a specification.

The improvement relates to the manufacture of that description of harness in which the eyes are formed in pairs, and it has especial reference to the knitting of the heddle-twines to the rig-bands.

It consists in a harness formed by knitting the heddle-twines to the rig-bands by successively drawing three loops within three loops, each assemblage of loops so drawn within the preceding assemblage consisting of a binding-twine, which is wound loosely around one of the said rig-bands, and of two heddle-twines, which respectively connect the alternate heddle-eyes of successive pairs of eyes, each of which is folded or looped at the said rig-band.

In the manufacture of harness in which the eyes are formed singly one after another, it has been a custom to knit the heddle-twines which lead from the heddle-eyes to the rig-band by a crochet-stitch consisting of a double loop drawn within a double loop, each double loop consisting of a binding-twine which is wound loosely around the rig-band and a twine which connects the heddle-eye last formed with a heddle-eye in the process of formation. In the completed harness this last-mentioned twine is a continuous twine folded on one side of the harness in a zigzag manner from heddle-eye to rig-band, back to the next heddle-eye and to the rig-band again, and so on through the whole harness. On the other side of the harness, known as the knotted side, there is a similar continuous twine folded in the same zigzag manner from heddle-eye to rig-band, except that the eyes themselves are made from it by tying a knot; but on either side of the harness each fold of the zigzag twine at or near the rig-band—that is, each fold in the zigzag twine which is midway between two heddle-eyes—is seized by a crochet-needle or other suitable instrument, along with the binding-twine, and the two twines are drawn as a double loop through the next preceding double loop, which has been formed in the same manner. The drawing of one double loop through the preceding double loop tightens the said preceding double loop, and the zigzag heddle-twine is thus secured or knitted to the rig-band. Now, when in the manufacture of the harness the heddle-eyes are made in pairs, or two are formed simultaneously, there are on each side of the harness, both the knotted and the looped side, two zigzag twines, one to connect the even-numbered heddle-eyes and the other to connect the odd-numbered heddle-eyes to the rig-band, and in knitting these two zigzag twines to the rig-band according to my present invention I seize them both, each midway between its heddle-eye which has been last formed and its heddle-eye which is in the process of formation, and at the same time seize the binding-twine which has been wound loosely around the rig-band, and then draw the three twines together in the form of a triple loop through the preceding triple loop, which has been formed in the same manner. Substantially, as in the manufacture of the harness previously described, the drawing of one triple loop through the preceding triple loop tightens the said preceding triple loop.

Figure 2:
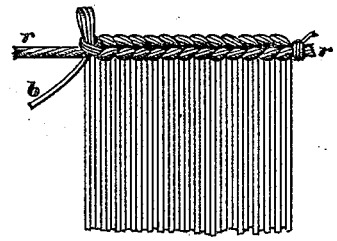
Figure 3:
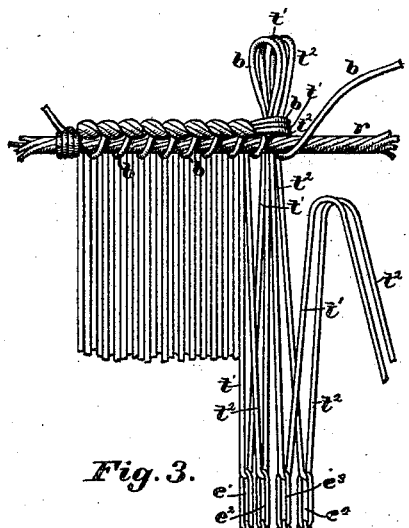
Figure 4:
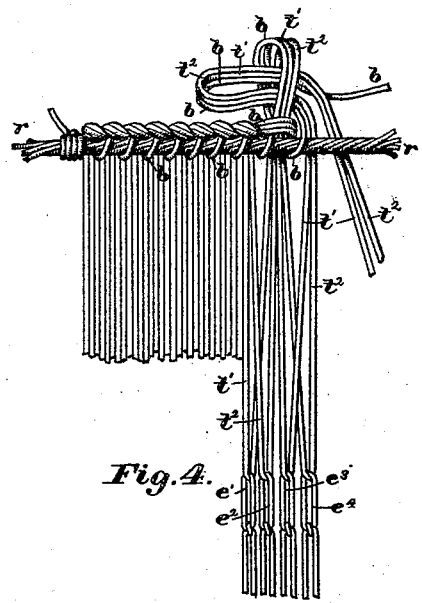
Figure 5:
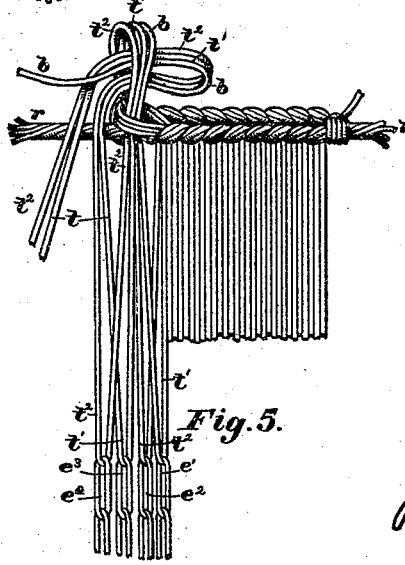
Figure 6:
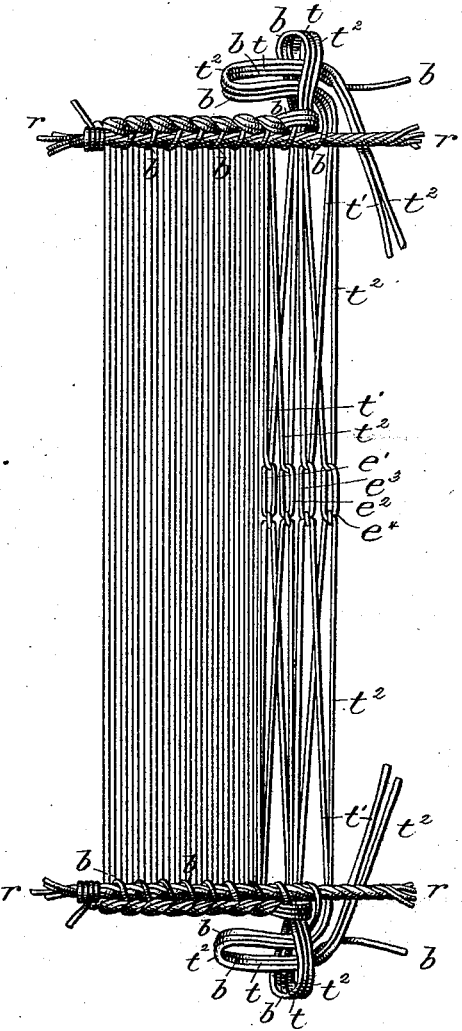

In the drawings, Figure 1 is a back view of a section of a harness in which the heddle-twines have been knitted to the rig-band according to my invention. Fig. 2 is a front view of the same section. Fig. 3 is a view, upon an enlarged scale, corresponding to Fig. 1, but showing also the heddle-eyes and the zigzag manner in which the heddle-twines lead therefrom. Fig. 4 is also a back view upon an enlarged scale, and shows the manner in which an assemblage of three loops is drawn within a preceding assemblage of three loops. Fig. 5 is the reverse of Fig. 4. Fig. 6 is a front view of a section of complete harness. It is in part the same view which is given at Fig. 4, but presents also the other side.

In all the figures the loops are considerably exaggerated.

The rig-band is marked $r$, while $b$ is the binding-twine.

$e'$ $e^3$ are odd-numbered eyes. $e^2$ $e^4$ are even-numbered eyes, and of these $e'$ and $e^2$ are to be considered as the two eyes last formed, and $e^3$ and $e^4$ are to be considered as the two eyes in the process of formation, according to the preceding description, although, more strictly speaking, the knots of all four eyes are represented as tied, and the two heddle-twines $t'$ $t^2$ might be described as respectively connecting the alternate eyes $e'$ $e^3$ and $e^2$ $e^4$ of the last two pairs of eyes. The continuous zigzag twine connecting the odd-numbered eyes is marked $t'$ at many places, while the other zigzag twine is marked $t^2$.

At the stage of the operation shown at Fig. 3 it will be observed that two heddle-twines, $t'$-$t^2$, with the binding-twine $b$, form a triple loop that has been drawn within a preceding triple loop which has been tightened. At the stage of the operation shown at Figs. 4 and 5 the triple loop receiving the last triple loop has not been tightened.

It is believed that further description of the knitting or of the stitch is unnecessary.

I claim—

A loom-harness consisting of heddle-twines with eyes formed therein, two rig-bands and a binding-cord for each of said rig-bands, the said heddle-twines being secured to the rig-band on either side by means of one of the said binding-cords wound once around its rig-band for every two pairs of heddle-twines, and the knitting being such that on each side three loops are successively held within three loops, each assemblage of loops consisting of the binding-twine wound as aforesaid and two heddle-twines which respectively connect with the alternate eyes of successive pairs of eyes and are folded each midway between the eyes it connects, substantially as described.

JOSEPH SLADDIN.

Witnesses:
W. W. SWAN,
WM. S. ROGERS.